Figure 1:
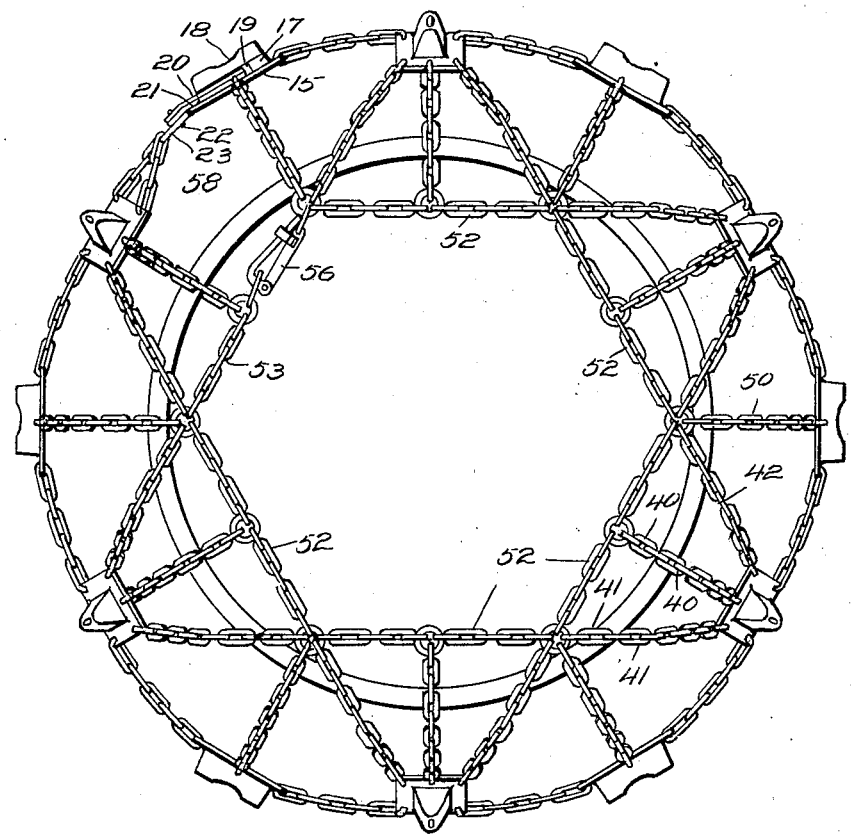

Jan. 8, 1924.

O. D. FOSBURGH 1,480,384

TIRE CHAIN

Filed Dec. 27, 1922    2 Sheets-Sheet 1

INVENTOR.
O. D. Fosburgh.
BY
Geo. P. Kimmel.
ATTORNEY.

Jan. 8, 1924.
O. D. FOSBURGH
TIRE CHAIN
Filed Dec. 27, 1922
1,480,384
2 Sheets-Sheet 2
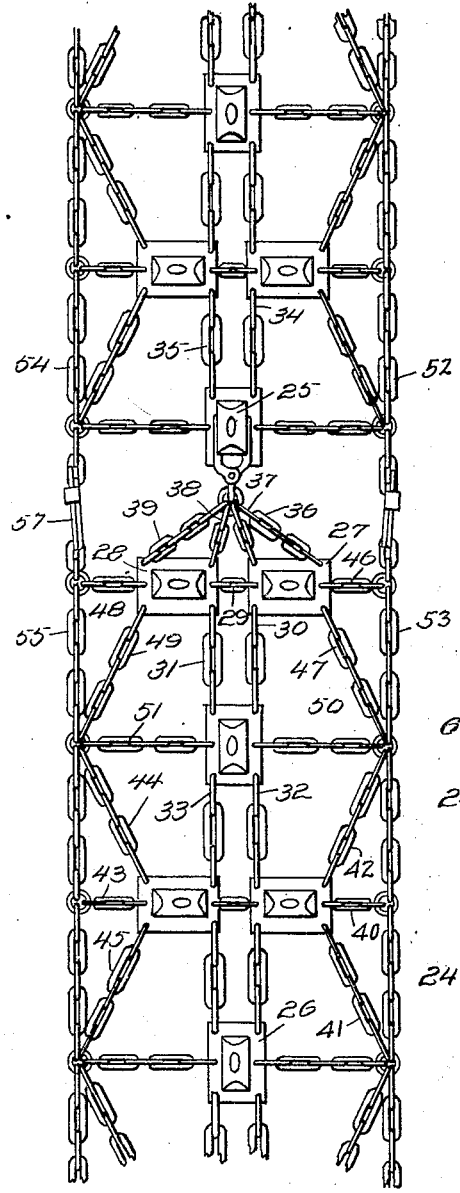
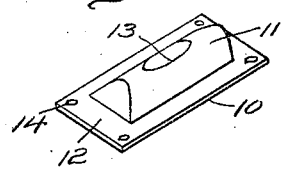
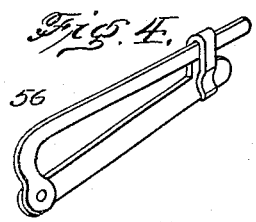
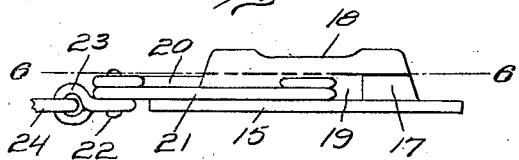
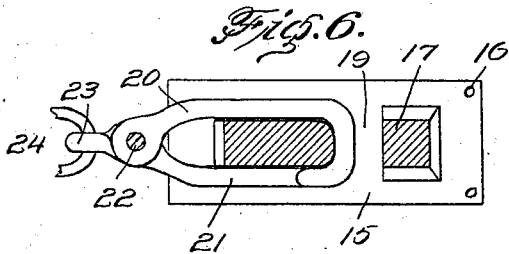
INVENTOR.
O. D. Fosburgh.
BY
Geo. P. Kimmel
ATTORNEY.

Patented Jan. 8, 1924.

1,480,384

UNITED STATES PATENT OFFICE.

OGDEN D. FOSBURGH, OF ST. JOSEPH, MISSOURI.

TIRE CHAIN.

Application filed December 27, 1922. Serial No. 609,239.

*To all whom it may concern:*

Be it known that I, OGDEN D. FOSBURGH, a citizen of the United States, residing at St. Joseph, in the county of Buchanan and State of Missouri, have invented certain new and useful Improvements in Tire Chains, of which the following is a specification.

This invention relates to tire chains, of that class of anti-skid chain construction for employment in connection with the wheel tires of motor and other vehicles, and has for its object to provide in a manner as hereinafter set forth, a tire chain wherein when the same is applied to a tire of a wheel of a vehicle will assure positive traction and prevent slipping or skidding during the travel of the wheels of the vehicle over a slippery surface.

A further object of the invention is in the provision of a chain of such class with sets of flexibly connected traction elements and a set of flexibly connected anti-skid elements, the said elements disposed circumferentially of the wheel tire and with the traction elements of a set connected together, maintained in position and braced by intersecting sustaining members coupled with the anti-skid elements, whereby when the chain is mounted in position with respect to the wheel, the traction and anti-skid elements will be suspended in proper relation to the tread of the tire and will be flexibly supported for movement to avoid any interference of the yielding of the tire when in use, at the same time providing for positive traction and preventing slipping or skidding during the travel of the vehicle.

Further objects of the invention are to provide a tire chain of the class referred to which is comparatively simple in its construction and arrangement, readily applied in operative relation with respect to a wheel tire, strong, whereby maximum wear is afforded thereby increasing the life of the same, efficient in its use, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a wheel tire showing the adaptation therewith of an anti-skid chain in accordance with this invention, Figure 2 is an enlarged fragmentary view, in plan, of an anti-skid chain in accordance with this invention, Figure 3 is a perspective view of a traction or an anti-skid element, Figure 4 is a like view of a connecting member, Figure 5 is a side elevation and Figure 6 a section on line 6—6 of Figure 5 of a combined coupling and anti-skid element.

A tire chain in accordance with this invention includes two sets of traction elements, a set of anti-skid elements, a combined coupling and anti-skid element and flexible sustaining and brace members.

The traction and anti-skid elements are disposed circumferentially with respect to the tire tread and with the anti-skid elements positioned at the center of the tread and with each set of traction elements arranged to one side of the center of the tread and disposed at right angles with respect to the anti-skid elements.

The traction and anti-skid elements, with the exception of the combined coupling and anti-skid element, are of like construction and the description of one will apply to all of the others, and the said element consists of a rectangular base plate 10, having formed integral with its upper face, a lengthwise extending lug 11, which is triangular in cross section and is of less width at its base than the width of the plate 10, and is also of less length than the length of the plate 10, and is so disposed with respect to the upper face of the plate 10 to provide a marginal portion 12, extending entirely around the same. The top of the lug 11, is formed with a groove or indentation 13. Each corner of the plate 10 has an opening 14.

The combined coupling and anti-skid element comprises a rectangular base plate 15, having each corner at one end thereof provided with an opening 16, and formed integral with the upper face of the plate 15, is a lug 17, of less width and of less length than the width and length of the plate 15, and is triangular in cross section. The lug 17, at its top is cut away or indented as at 18, and said lug 17, is furthermore provided with a transverse opening 19, through which extends a coupling member formed of a pair of arms 20, 21, the former being hook shaped and is adapted to extend through the opening 19, and overlap the lug 17. The arms 20, 21, are pivotally connected together as at 22, and the arm 21, is extended from the pivot 22, to provide an eye 23, which carries a link 24. The coupling function of the combined coupling and anti-skid element will be presently referred to and it is indicated generally by the reference character 25.

The elements of the set of anti-skid elements are indicated at 26, and the element 25 forms one of the set of anti-skid elements.

The elements of one set of traction elements are indicated at 27, and the elements of the other set of traction elements are indicated at 28.

The elements 27, align with the elements 28, and the aligning traction elements have their opposed ends connected together by a short chain 29. By setting up the traction elements in the manner as stated, they are arranged in pairs and the elements of each pair extend in opposite directions with respect to each other and positioned between the pairs of traction elements are the anti-skid elements which are disposed at right angles with respect to the traction elements and each anti-skid element is connected to two pair of traction elements. One end of an anti-skid element 26 is connected to the elements of a pair of traction elements by a pair of short chains 30, 31, and to the other pair of traction elements by a pair of short chains 32, 33. The combined coupling and anti-skid element 25, is arranged between two pair of traction elements and one end of the element 25, is connected with a pair of traction elements by a pair of short chains 34, 35, and the said anti-skid element 25, is coupled with the other pair of traction elements by short chains 36, 37, 38 and 39, which extend from the link 24, and are attached to the traction elements as clearly shown in Figure 2.

To the outer end of each traction element 27, with the exception of that traction element 27, to which the chains 36 and 37 are connected, are attached chains 40, 41 and 42, the chains 41 and 42 extend at an inclination and in opposite directions with respect to chain 40, the latter being positioned between the chains 41 and 42. To the outer end of each traction element 28, with the exception of that traction element 28 to which the chains 38 and 39 are connected, are attached chains 43, 44 and 45, the chains 44 and 45 extending at an inclination and in opposite directions with respect to chain 43, the latter being positioned between the chains 44 and 45.

The traction element 27, to which is connected the chains 36, 37, has extending from its outer end chains 46, 47, the latter is disposed at an inclination with respect to the former. The traction element 28, to which the chains 38, 39 are connected has projecting from its outer end, chains 48, 49, the latter being disposed at an inclination with respect to the former.

Projecting outwardly from each side of each of the anti-skid elements, including the combined coupling and anti-skid element, is a connecting chain and these chains are indicated at 50 and 51.

A series of coupling chains is provided for connecting the outer ends of the chains 40, 41, 42, 47 and 50, together and the said coupling chains are indicated at 52, 53. A series of coupling chains is employed for connecting the outer ends of the chains 43, 44, 45, 48, 49 and 51, together and the said coupling chains are indicated at 54, 55. The coupling chains 52, 53, are arranged on one side of the wheel and the coupling chains 54, 55, are arranged on the other side of the wheel. The coupling chains 52, 53, are connected together by a latch member 56, and the coupling chains 54, 55, are connected together by a latch member 57.

The arrangement of the chains 41, 42, with their associated coupling chains provide sustaining members and the arrangement of the chains 44, 45, and their associated coupling chains form sustaining members.

Owing to the manner in which the anti-skid elements, as well as the combined coupling and anti-skid element are connected with the traction elements and with the sustaining members, they are also maintained in proper position relative to the tread of the tire 58.

It is apparent that each of the traction elements as well as each of the anti-skid elements, is free for movement and will always properly position themselves when the chains have been relieved from strains or stresses, which cause the distortion of the chains, and although the foregoing description taken in connection with the accompanying drawings, sets forth the preferred embodiment of the invention, yet it is to be understood that changes in the details of construction can be had without departing from the scope of the invention as claimed.

What I claim is:—

1. An anti-skid device comprising a set of anti-skid elements, two sets of traction elements, the traction elements of one set opposing the traction elements of the other set and flexibly connected therewith, means for flexibly connecting the anti-skid elements to the sets of traction elements, flexible members connected to and projecting outwardly from the elements of each set of traction elements, two sets of flexible elements, each set of flexible elements connected to the outer ends of the flexible members which project outwardly from a set of traction elements and providing in connection with said members sustaining means for the traction elements, and means for flexibly connecting the anti-skid elements to the said sets of flexible elements.

2. An anti-skid device comprising a set of anti-skid elements, two sets of traction elements, the traction elements of one set opposing the traction elements of the other set and flexibly connected therewith, means for flexibly connecting the anti-skid elements to the sets of traction elements, flexible members connected to and projecting outwardly from the elements of each set of traction elements, two sets of flexible elements, each set of flexible elements connected to the outer ends of the flexible members which project outwardly from a set of traction elements and providing in connection with said members sustaining means for the traction elements, and means for flexibly connecting the anti-skid elements to the said sets of flexible elements, said traction elements disposed at right angles with respect to said anti-skid elements.

3. An anti-skid device comprising a set of anti-skid elements, a series of pairs of traction elements, the traction elements of each pair extending in opposite directions with respect to each other, the said anti-skid elements alternately disposed with respect to the pairs of traction elements, means for flexibly connecting the traction elements of each pair together, means for flexibly connecting the anti-skid elements to the pairs of traction elements, flexible members connected to and projecting outwardly from the elements of each set of traction elements, two sets of flexible elements, each set of flexible elements connected to the outer ends of the flexible members which project outwardly from a set of traction elements and providing in connection with said members sustaining means for the traction elements, means for flexibly connecting said anti-skid elements to said sets of flexible elements.

4. An anti-skid device comprising a set of anti-skid elements, a series of pairs of traction elements, the traction elements of each pair extending in opposite directions with respect to each other, the said anti-skid elements alternately disposed with respect to the pairs of traction elements, means for flexibly connecting the traction elements of each pair together, means for flexibly connecting the anti-skid elements to the pairs of traction elements, flexible members connected to and projecting outwardly from the elements of each set of traction elements, two sets of flexible elements, each set of flexible elements connected to the outer ends of the flexible members which project from a set of traction elements and providing in connection with said members sustaining means for the traction elements, means for flexibly connecting said anti-skid elements to said sets of flexible elements, the traction elements of each set disposed at right angles with respect to the anti-skid elements.

5. An anti-skid device comprising a set of anti-skid elements, a series of pairs of traction elements, the traction elements of each pair extending in opposite directions with respect to each other, the said anti-skid elements alternately disposed with respect to the pairs of traction elements, means for flexibly connecting the traction elements of each pair together, means for flexibly connecting the anti-skid elements to the pairs of traction elements, flexible members connected to and projecting outwardly from the elements of each set of traction elements, two sets of flexible elements, each set of flexible elements connected to the outer ends of the flexible members which project outwardly from a set of traction elements and providing in connection with said members sustaining means for the traction elements, and means for detachably connecting one of said anti-skid elements to a pair of said traction elements.

6. An anti-skid device comprising a set of anti-skid elements, a series of pairs of traction elements, the traction elements of each pair extending in opposite directions with respect to each other, the said anti-skid elements alternately disposed with respect to the pairs of traction elements, means for flexibly connecting the traction elements of each pair together, means for flexibly connecting the anti-skid elements to the pairs of traction elements.

In testimony whereof, I affix my signature hereto.

OGDEN D. FOSBURGH.